(12) United States Patent
Asati et al.

(10) Patent No.: US 8,650,618 B2
(45) Date of Patent: Feb. 11, 2014

(54) INTEGRATING SERVICE INSERTION ARCHITECTURE AND VIRTUAL PRIVATE NETWORK

(75) Inventors: Rajiv Asati, Morrisville, NC (US); Mohamed Khalid, Cary, NC (US); Sunil Cherukuri, Morrisville, NC (US); Kenneth A. Durazzo, San Ramon, CA (US); Shree Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 641 days.

(21) Appl. No.: 12/507,422

(22) Filed: Jul. 22, 2009

(65) Prior Publication Data
US 2011/0023090 A1 Jan. 27, 2011

(51) Int. Cl.
*G06F 7/04* (2006.01)
(52) U.S. Cl.
USPC .......................................................... 726/4
(58) Field of Classification Search
USPC .......... 713/151, 153, 168, 171; 709/220, 238; 726/4, 15
See application file for complete search history.

(56) References Cited

U.S. PATENT DOCUMENTS

| | | | |
|---|---|---|---|
| 6,980,526 B2 * | 12/2005 | Jang et al. | 370/260 |
| 2005/0135359 A1 * | 6/2005 | Chang | 370/389 |
| 2007/0248091 A1 * | 10/2007 | Khalid et al. | 370/392 |
| 2008/0080517 A1 * | 4/2008 | Roy et al. | 370/395.5 |
| 2008/0177896 A1 | 7/2008 | Quinn et al. | |
| 2008/0320303 A1 | 12/2008 | Khalid et al. | |

* cited by examiner

*Primary Examiner* — Beemnet Dada
(74) *Attorney, Agent, or Firm* — Hickman Palermo Truong Becker Bingham Wong LLP (57) ABSTRACT

Apparatus, methods, and other embodiments associated with providing service insertion architecture (SIA) differentiated services in a virtual private network (VPN) environment are described. Embodiments may provision an authentication, authorization, and accounting (AAA) server with user-to-SIA service-context mapping information. With the AAA server provisioned, embodiments may acquire, in an IPSec VPN hub, during IPSec tunnel user authentication, from the AAA server, the user-to-SIA service-context mapping information. With the mapping information available, embodiments may dynamically map an SIA service to an IPSec VPN tunnel user based on the service information acquired from the Service Broker or Pseudo-Service Broker. The dynamic mapping facilitates providing differentiated services in the SIA by facilitating forwarding an IPSec packet received on the IPSec VPN tunnel from the user to a service node associated with the SIA service based, at least in part, on the IPSec SADB entry modified using the service information.

25 Claims, 8 Drawing Sheets

INTEGRATING SERVICE INSERTION ARCHITECTURE AND VIRTUAL PRIVATE NETWORK

TECHNICAL FIELD

This disclosure relates generally to virtual private networks.

BACKGROUND

Service Insertion Architecture (SIA) provides a platform independent framework for inserting services into a network. A service may be regarded as an application that operates at one or more layers of the Open System Interconnect (OSI) networking stack. For example, a service may be an application that operates at one or more of, layers three (L3) (Network) through seven (L7) (Application). A service may be considered to be an optional function performed on a network that provides some value to a network user. Services may include, for example, encryption, decryption, special routing, intrusion management, and accounting. A service may be distributed throughout members of a service path. The members may be referred to as service nodes.

SIA includes a control plane entity that is known as a service broker (SB). Services register with a service broker and thus a service broker can provide a consistent domain-wide service view. A service may be implemented as a service path. A service path may be organized as an ordered list of segments, where a segment represents a service feature provided by a service node. A service broker can, therefore, instantiate service paths when service nodes are registered. A consumer of a service may be referred to as a service classifier (SCL). A service broker can allocate a service path to a consumer when the consumer registers with the broker. A service broker may also distribute information concerning service path segments to service nodes and to consumers to facilitate setting up the data plane for the SIA.

BRIEF DESCRIPTION OF THE DRAWINGS

The accompanying drawings, which are incorporated in and constitute a part of the specification, illustrate various example systems, methods, and other example embodiments. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DESCRIPTION OF EXAMPLE EMBODIMENTS

Overview

In one embodiment, a method includes, upon determining that an IPSec tunnel associated with a virtual private network (VPN) is being established for a remote access user, requesting mapping information that correlates a service insertion architecture (SIA) service-context to the remote access user. The mapping information is requested from an authentication logic during IPSec authentication message exchange associated with the IPSec tunnel. The method includes receiving the mapping information from the authentication logic and selectively providing differentiated services in the SIA for the remote access user based, at least in part, on the mapping information.

In one embodiment, an apparatus includes a control plane logic configured to dynamically map an SIA service to an IPSec VPN tunnel user based, at least in part, on a user-to-SIA service-context mapping acquired during authentication of the user to the IPSec VPN tunnel during IPSec VPN tunnel establishment. The apparatus also includes a data plane logic configured to selectively forward an IPSec packet received on the IPSec VPN tunnel from the user to a service node associated with the SIA service based, at least in part, on the SADB entry derived as a function of the mapping and service information provided by a service broker to a service classifier.

Description

A virtual private network (VPN) facilitates establishing a connection between devices over a public network. A VPN may establish secure connections by encrypting and encapsulating packets that travel between a source and a destination. A VPN may include multiple components. In one example, a VPN may involve a client/remote component and a server component. Client/remote devices may include, but are not limited to, branch routers, and software clients. Client/remote devices may be configured to initiate a tunnel to the server. The tunneling may include encryption. Since the VPN may encrypt packets, in one example the tunnel may be an IPSec (Internet Protocol Security) tunnel. When the tunnel has been successfully established, the client/remote component may receive security policies from the server. Receiving the security policies from the server facilitates minimizing configuration requirements at the client/remote. The server may use a centralized policy push to automatically send predefined security policies and configuration parameters to client/remote components. In one example, the servers may use the IKE mode-configuration mechanism.

Both an SIA and a VPN have data planes and control planes. An SIA may interact with a VPN. When an SIA interacts with a VPN, there may be interactions in both the data planes and control planes at the interfaces between the SIA and the VPN. These interactions may affect a logical forwarding plane for the SIA-VPN combination. For example, when a VPN packet interacts with an SIA, the packet may travel from the packet's VPN forwarding plane to the SIA forwarding plane and then back to the packet's VPN forwarding plane to reach its original destination. When a VPN interacts with SIA, the two forwarding planes may be in two different forwarding domains. For example, the SIA forwarding plane may be in a global forwarding domain while the packet forwarding plane may be in a private forwarding domain.

It may be desirable to have a virtual private network (VPN) and a Service Insertion Architecture (SIA) operate together. However, if the SIA performs its own tasks in its own way while the VPN performs its own tasks in its own way, then there may be duplication, lack of integration, and inefficiencies. Therefore, example systems and methods attempt to integrate SIA and VPN so that duplication and inefficiencies may be mitigated, while integration is improved. Integration may be achieved by implementing SIA framework closer to the remote users associated with the VPN so that the SIA framework is available for providing differentiated services, even to tunneled packets associated with the VPN. In one example, the classification function of an SIA framework may be executed on an IPSec VPN hub. In another example, the classification function of an SIA framework may be executed even further out, on a branch router that intermediates the remote user traffic of a particular branch to and from the VPN Hub using a tunneling technology (e.g., IPSec). In both examples, the device to which the SIA function is pushed acquires knowledge about the SIA service context so that the packet can be forwarded to an appropriate SIA service node (SN) for the desired service.

Integration may involve establishing and storing mappings that correlate users and SIA service contexts, which may also be referred to as SIA service-contexts. The mappings may be stored in an authentication, authorization, and accounting (AAA) server used by IPSec. The information may be passed from the AAA server to an IPSec VPN hub, and then passed even further, (e.g., to VPN branch router), using Internet Key Exchange (IKE) messages that are exchanged when a remote access user takes actions that initiate tunnel setup. While the IKE messages are exchanged to establish the tunnel, the additional SIA information may be associated with the tunnel to formulate how an SIA service classifier (SCL) will treat remote user traffic after the service classification with respect to forwarding to service nodes and providing differentiated services. When the integration is implemented at the IPSec VPN hub, service classification and differentiation may be performed on traffic that has already entered a tunnel. When the integration is implemented all the way out at a VPN branch router, the service classification and differentiation may be performed before remote user traffic enters the tunnel.

This paragraph describes how a packet associated with a VPN interacts with an SIA. The packet will enter the VPN plane, traverse some of the VPN plane, and then exit the VPN plane as it enters the SIA plane. The packet will then traverse an SIA service path using the SIA forwarding plane and ultimately reach the end of the SIA service path. At this point the packet will exit the SIA plane and desire to re-enter the VPN plane. Conventionally it has been difficult, if even possible, to re-enter the VPN plane due to the loss of VPN information that was available when the packet left the VPN plane and entered the SIA plane. The VPN information may not have been available when the packet was ready to leave the SIA plane. Complex signaling protocols may have mitigated some of these issues, but with undesirable and/or unacceptable levels of complexity, processing requirements, and/or timing delays.

In the SIA data plane, a service classifier intercepts certain packets and redirects them onto the service path. The traffic in the service path flows from one service node to another service node and from one service to another service until a final service node is reached. This final service node is responsible for forwarding the packet to its original destination. If the original destination was part of the global forwarding plane, this may be a straightforward task. However, if the original destination was part of a private forwarding plane, conventionally this may have been a challenge.

One attribute of an SIA is network topology independence. Services may reside at different locations in a network, independent of network path or network node deployment. Another attribute of SIA is inter-service communication. This communication facilitates a state sharing mechanism to chain services together and to share information between those services. Another attribute is service topology independence. This attribute concerns how the actual form (e.g., distributed, decentralized) of a service does not matter. SIA also provides consistent administration and management policies. These attributes facilitate SIA redirection, where packets may be redirected to an appropriate service node in a network independent of the physical location of that service node. The packets can be routed based on their service context.

Understanding the SIA data plane functions includes examining classification and SIA context tagging, redirection, service selection, and packet forwarding. A service classifier intercepts traffic desiring a service and adds a unique identifier to packets that enter the relevant service path. The unique identifier may be, for example, a service header identifier. The service header identifier may convey the classification context that resulted from the classification. Service nodes in the service path apply service specific policies to packets as a function of information conveyed in the service header. The service header identifier may remain unchanged as a packet traverses a service path.

Redirection occurs at the data plane level as SIA physical devices forward tagged packets to the next physical device in a service path. The SIA physical devices may include service classifiers and service nodes. Ultimately, at the end of the service path, a service node will be responsible for handing a packet to a routing plane. Adding additional information to an SIA packet to facilitate handing the packet to the next routing plane may have included complex signaling protocols and/or updating each member of a service path. This has generally been unacceptable. The redirection performed by service nodes in the service path may rely on transport mechanisms available in an underlying network. Logically and/or physically adjacent peer SIA devices share redirection encapsulation. This redirection encapsulation facilitates carrying SIA traffic for multiple service paths that flow between the logically and/or physically adjacent SIA devices.

Service selection involves routing an SIA packet to an appropriate logical service. This action occurs in the SIA forwarding plane. The SIA forwarding plane may be physically and/or logically separate from the service plane where the actual service is performed. The SIA forwarding plane may rely on an SIA header context that includes a service header identifier and a service sequence number. The SIA header context may determine the next hop transport encapsulation.

Recall how a packet is forwarded. An SIA packet travels from the packet's forwarding plane to the SIA forwarding plane and back to the packet forwarding plane to reach the original destination known to the packet's forwarding plane. However, when an SIA interacts with a VPN, these two planes are in two different, potentially incompatible, potentially unresolvable, forwarding domains. The SIA forwarding plane is in a global forwarding plane while the packet forwarding plane may be in a private plane associated with the VPN. Conventional attempts to resolve this issue may have involved complex signaling protocols and/or updating every member of a service path, both of which are sub-optimal.

Both VPNs and SIAs are useful and interesting frameworks. Conventionally the two frameworks may have been used in isolation. However, it may be desired to provide the SIA framework in a VPN environment. For example, network operators may desire to have SIA services available to remote (e.g., VPN) users in a manner similar to that of the local users.

Additionally there may be inconsistencies between traffic forwarding techniques employed in the two frameworks and environments that lead to issues integrating the two frameworks. For example, an SIA may not address IPSec VPN remote users connecting into a VPN hub node, which is also part of the SIA framework. VPN programs coupled with IPSec and/or other tunnel technologies can result in more than one VPN user being associated with a single interface in a dynamic manner, while SIA statically classifies and maps one interface to one SIA service-context. This results in IPSec VPN remote users inheriting the same SIA context that is applied to the interface. However, corresponding IPSec tunnels may be terminated, which may not be a desirable result.

VPN user traffic may be encapsulated inside IPSec tunnels and thus not be available for SIA classification prior to the cryptography operations. This unavailability may potentially prohibit VPN user traffic from being mapped to an SIA service-context. Therefore, to apply SIA in the VPN environment, the traffic from the VPN users is classified according to SIA classification rules after the cryptography operations have taken place. The cryptography operations may include, for example, decryption, and decapsulation. Therefore, one non-optimal approach to providing SIA in a VPN environment could involve a convoluted, multi-step process of classifying an ingress packet that corresponds to VPN user traffic, decrypting and decapsulating the ingress packet, sending the packet back to the ingress interface, and then reclassifying the now clear packet to apply SIA services. However, an ingress interface could receive both IPSec and non-IPSec traffic, which could be problematic if classification rules overlapped.

Figure 3:
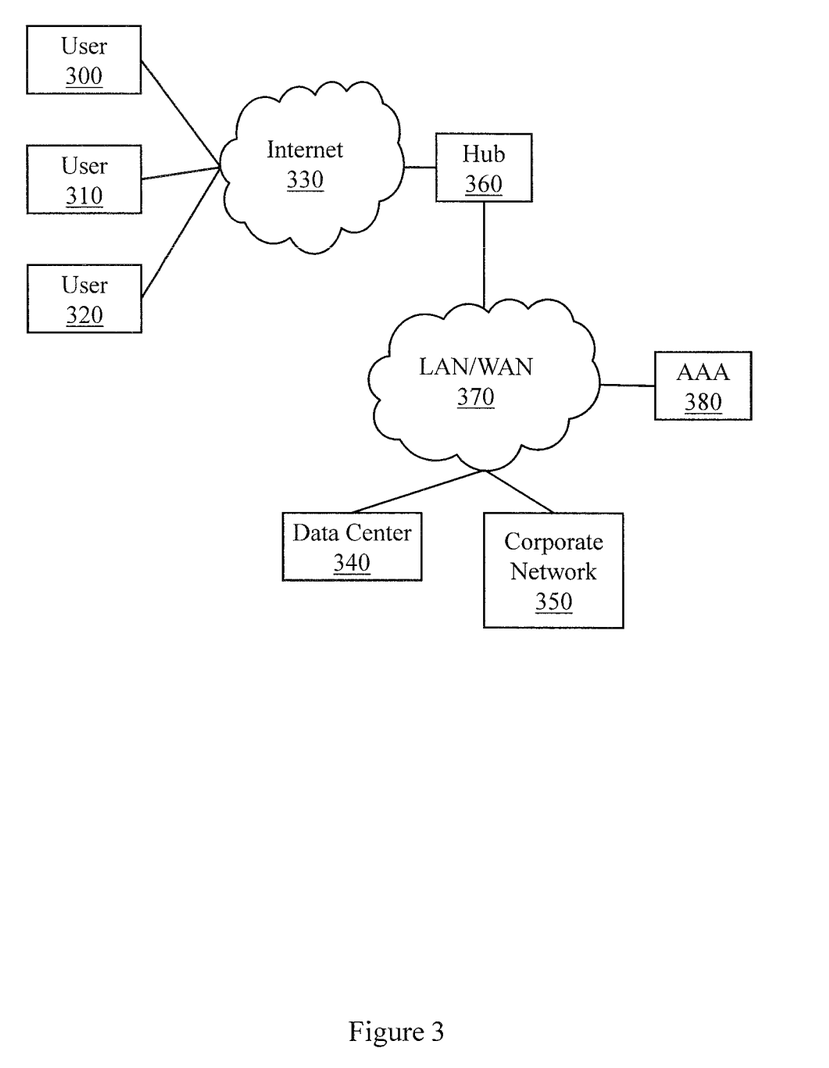
FIG. 3 illustrates a VPN environment.

Remote access IPSec VPN technology is frequently used to securely connect remote access users to a corporate network over a public network like the Internet. The secure connection may use IPSec cryptography. A simple IPSec VPN topology is presented in FIG. 3. A set of users (e.g., 300, 310, 320) use the internet 330 to access a data center 340 or corporate network 350. A hub 360 interacts with a local or wide area network 370. The hub 360 also interacts with an AAA server 380. The AAA server 380 performs authentication, authorization, and accounting functions. The authentication concerns proving that an entity is who it asserts to be. The authorization concerns deciding what service(s) an authenticated entity is allowed to use. The accounting concerns recording what was actually done and/or attempted.

IPSec is a dual mode end-to-end security scheme that operates at the IP layer, which may also be referred to as L3. IPSec negotiates cryptographic keys for a session and establishes mutual authentication between IPSec endpoints at the beginning of a session. The session may be referred to as tunnel between IPSec endpoints. IPSec may use Internet Key Exchange (IKE) to set up a security association (SA). The SA records shared security information between network entities and may include cryptographic keys, and digital certificates. An SA may be thought of as being the bundle of algorithms (e.g., cryptographic techniques) and parameters (e.g., keys) that are used to encrypt/decrypt and authenticate a particular data flow in a direction. Information about security associations may be stored in a Security Association Database (SADB). A Security Parameter Index (SPI) may be used to index into the SADB. Example systems and methods use the IKE exchange to facilitate integrating SIA functionality with a VPN.

IPSec is a dual mode end-to-end security scheme that operates at the IP layer. IPSec may work in a transport mode where only a packet payload is encrypted or IPSec may work in a tunnel mode where an entire IP packet, including its payload and IP header, is encrypted and then encapsulated into a new IP packet. IPSec is used to authenticate and encrypt IP packets for a data stream. A data stream is a sequence of related digitally encoded coherent signals (e.g., packets) that are used to transmit or receive information. IPSec can protect packet data flows between pairs of hosts (e.g., users, servers), between pairs of security gateways (e.g., routers, firewalls), between security gateways and hosts, and between other entities. IPSec may use an Authentication Header (AH) to provide connectionless integrity and data origin authentication.

SIA provides a platform independent framework for inserting services into a network. SIA provides a brokered service framework for inserting services into a network in a distributed and scaled manner. The services may include, for example, firewall services, IPSec services, and caching services executed on one or more Service Nodes. The Service Nodes may be located in a single hardware device, may be distributed among multiple hardware devices, may be located in a single software entity, may be distributed between multiple software entities, and may be distributed in other ways. A service may be implemented as a service path. A service path may be organized as an ordered list of path segments and a segment may represent a service feature provided by a service node.

SIA includes a control plane entity that is known as a service broker (SB). A Service Node (SN) registers with a service broker (SB) and thus a service broker can provide a consistent domain-wide service view. An SB can instantiate service paths when service nodes are registered. A service consumer may be referred to as a service classifier (SCL). A service broker can allocate a service path to a consumer when the consumer registers with the broker. A service broker may also distribute information concerning service path segments to service nodes and to consumers to facilitate setting up the data plane for the SIA.

Figure 4:
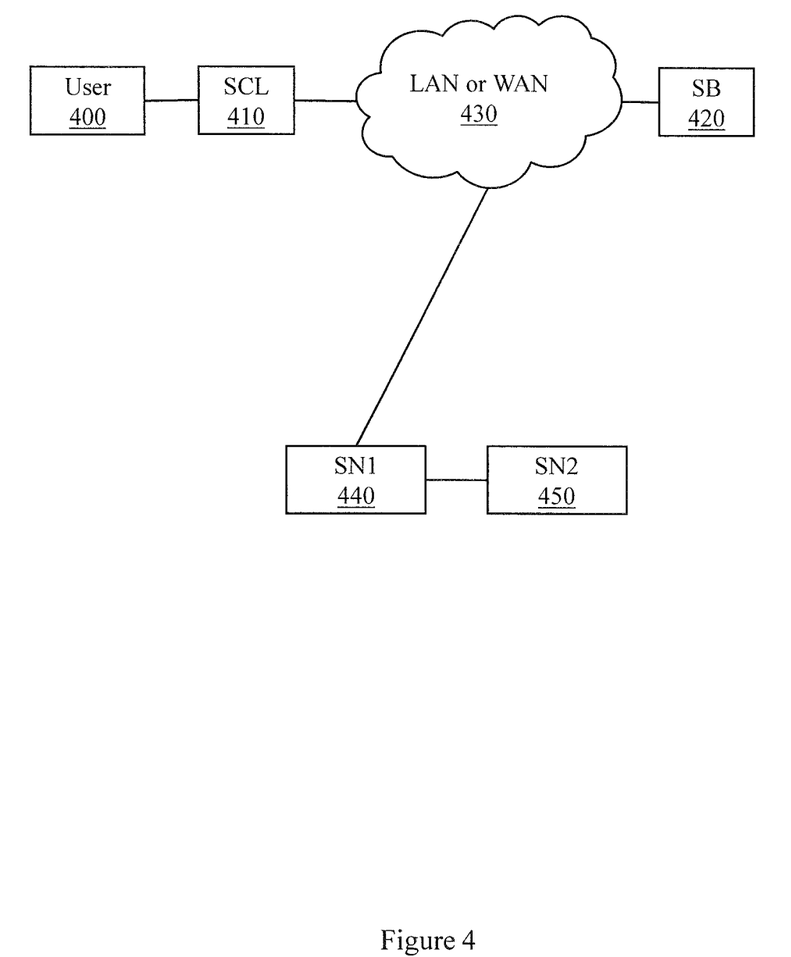
FIG. 4 illustrates an SIA environment.

An example SIA topology is illustrated in FIG. 4. A user 400 interacts with an SCL 410. The SCL 410 interacts with a local or wide area network 430. The topology includes a service broker (SB) 420 that can provide information about the topology. The topology also includes a couple of service nodes SN1 440 and SN2 450. While two service nodes SN1 440 and SN2 450 are illustrated, one skilled in the art will appreciate that a greater and/or lesser number of SNs may appear in an SIA topology.

An SCL may reside at the edge of the service domain associated with the SIA. The SCL classifies ingress traffic and maps that ingress traffic to a service path identified by the service context. The SCL may be pre-configured with information associated with classifying ingress traffic and with information associated with service-contexts. The SCL may also query an SB for additional information. This additional information may include, for example, a service table that includes information about a service path, a service header, a Service Node (SN), an SN next-hop, and encapsulation options. The encapsulation options may concern, for example, tunneling to SNs. SIA uses static classification to map one interface to one SIA service-context. However, multiple VPN and/or IPSec users may share that one interface. Recall that IPSec creates logical tunnel between the IPSec endpoints (e.g., VPN Hub, user) after the user is authorized. The original IP packet may be encapsulated in the IPSec tunnel and therefore no longer be available for SIA classification at the SCL. This may make it difficult to provide an SIA capable IPSec VPN framework and to provide differentiated services per user in an SIA/VPN environment.

Data traffic from the user may arrive at an SCL. When the data traffic arrives, the SCL may take actions based, at least in part, on a classification of the data traffic and the service table. For example, the SCL may encapsulate an original packet with a service header and may forward the processed packet to the first SN in a service path. The packet will then proceed through the service path, passing from SN to SN, until it reaches the end of the service path. After the packet reaches the end of the service path, the packet may then be sent to another (e.g., final) destination.

Example systems and methods facilitate mapping remote users into an SIA service-context at the IPSec VPN hub to facilitate improved traffic forwarding. In one example, remote users may be mapped to an SIA service-context in a dynamic manner during IKE exchange. In one embodiment this involves associating the IPSec SA with an SIA service-context at the IPSec VPN hub. Recall that SIA classification is performed on an ingress interface. Recall also that a VPN running IPSec may create a logical tunnel after a user is authorized. The original IP packet may be encapsulated inside the tunnel and thus no longer be available for SIA classification at the IPSec VPN hub. This may result in decapsulated packets not being mapped to an SIA service context.

Example systems and methods map an SIA service to an IPSec tunnel, map an SIA service to an IPSec user, or map an SIA service to an IPSec security association (SA). This facilitates providing an efficient and deployable approach for constructing an SIA capable IPSec VPN framework. Example systems and methods make the mapping available on a per tunnel/user basis during IKE control plane establishment. This facilitates providing differentiated services on a per user basis. Example systems and methods may map remote users to an SIA service-context in a dynamic manner during IKE exchange and then may associate the IPSec SA with the SIA service-context at the IPSec VPN Hub. This means that the SIA SCL functionality may be provided on the IPSec VPN Hub that handles remote access users and that dynamic mapping of remote users to appropriate SIA service contexts may occur when the users come online. In one embodiment, example systems and methods address service classification and differentiation for VPN users by classifying traffic based on IKE/IPSec identifiers. Different fields may be used to store information used in classification. For example, fields including but not limited to the FQDN (fully qualified domain name) field, the IP (Internet Protocol Address) field, the group name field, the username field, and the certificate field may be used to facilitate having the VPN hub act as an SCL. The VPN hub can classify one or more users to a particular SIA service-context and map to a service path based on the example fields.

Differentiated services may also be provided by VPN branch routers that connect through the Internet to an SIA enabled network. The SIA framework can be extended to branch sites so that a VPN branch router also performs the SCL functionality. In this embodiment, SIA classification and service path information is provided to the branch sites from the hub using IKE messages. A branch router may also function as an SCL/SN, and thus may provide classification and services to traffic through the tunnel and for local traffic outside a tunnel.

In one embodiment, a VPN Hub can act as an SIA SCL. In this embodiment, an existing control plane IKE authorization and/or authentication phase can provide classification and service-context mapping for a remote user's data plane traffic. The IKE-ID can be used to map decrypted IPSec traffic to an SIA service-context. The service-context can then be used to provide SIA services. In different examples, the IKE-ID may include an ID-KEY-ID VPN group name, an FQDN, an IP address, and a certificate field. Recall that an IKE exchange can include different phases. In one embodiment, when a VPN client/remote user sends an IKE-ID during IKE phase one negotiation, the Hub will use the IKE-ID to associate a service-context with an IPSec tunnel. In one embodiment, the ID-to-service-context mapping may be performed on the hub. In another embodiment, the ID-to-service-context mapping may be downloaded from the AAA (authentication, authorization, accounting) server during IKE authorization. Different fields, attributes, and other values may be used to convey the service-context from the AAA server to the hub.

An IPSec tunnel may correspond to one or more clients in a branch. An IPSec tunnel can be classified on a per user basis. An IPSec tunnel may also be classified on a per group basis. The IPSec tunnel can be classified independent of the IP addresses used by the traffic transiting through the tunnel. Individual IPSec users can be assigned a group name or other identifier based on a role. The AAA can be configured to associate SIA service-contexts with group names. The AAA can also be configured to associate SIA service-contexts with individual users. While an IKE-ID is described above, one skilled in the art will appreciate that other types of tunnels may employ other fields and other attributes. For example, encrypted tunnels including dynamic multipoint VPN (DMVPN), Group Encrypted Transport VPN (GETVPN), and Secure Sockets Layer VPN (SSLVPN) may use fields or data including NHRP ID (next hop routing protocol identifier), GDOI Group-ID (group domain of interpretation), usernames, and other values.

After a service-context to tunnel association is formed, it may be stored. In one example the service-context to tunnel association may be stored on an IPSec hub. The IPSec VPN hub may obtain an SIA service-context and may then query a SB for other information for that service-context. For example, the IPSec hub may query the SB for information including, but not limited to, a service path, a service header, service node IP, and tunnel information. Example systems may modify the IPSec security association database (SADB) so that it includes the mapping of IPSec SA to the service-context/service-path. In this embodiment, the VPN hub may decrypt a packet, insert an SIA header on the clear-text packet, and forward the packet to the first service node in a service path, as per the SADB entry.

Figure 1:
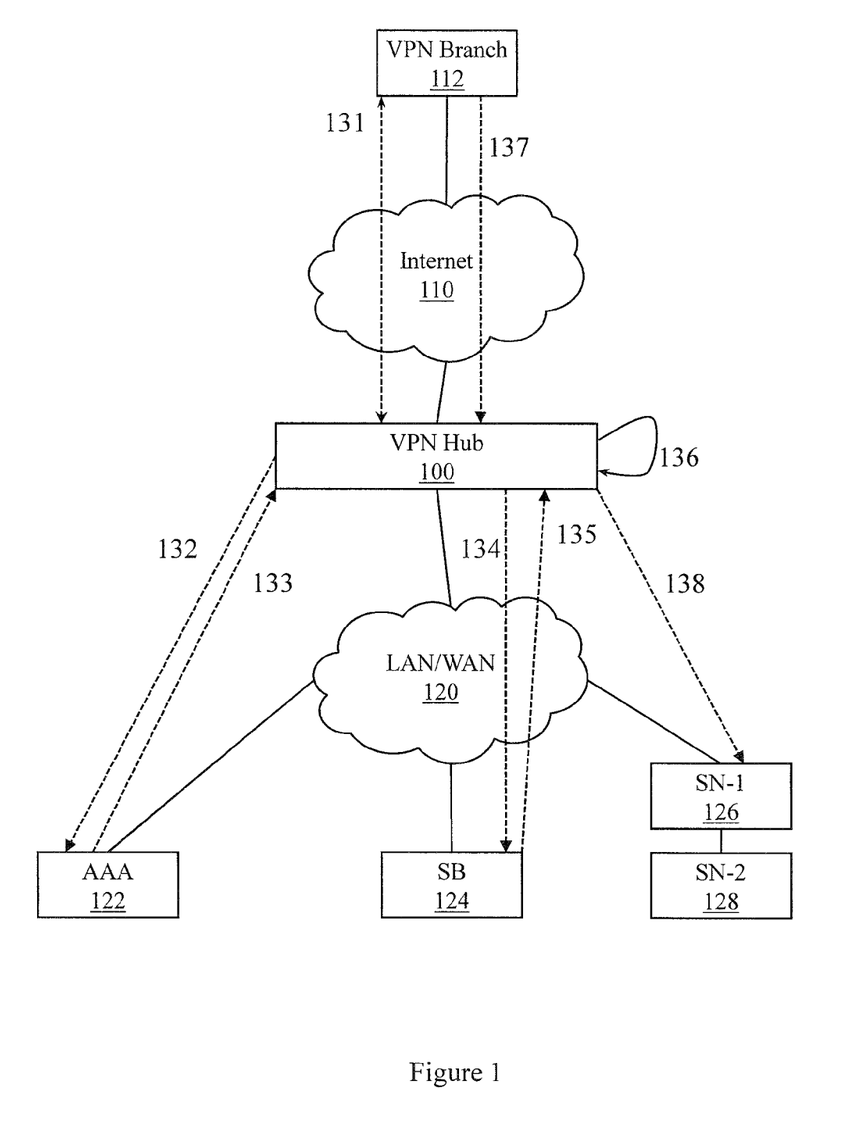
FIG. 1 illustrates an integration model where a Virtual Private Network (VPN) hub performs some SIA service classification activities.

FIG. 1 illustrates one example of IPSec SA to SIA service-context mapping associated with a VPN hub acting as the SCL. A VPN hub 100 is illustrated acting as a SCL. The VPN hub 100 sits between the internet 110 and another network 120 (e.g., local area network (LAN), wide area network (WAN)). The internet 110 connects a VPN branch 112 to the VPN hub 100. One or more users may be associated with the VPN branch 112. The network 120 connects an AAA server 122 to the VPN hub 100. The network 120 also connects an SIA SB 124 and two service nodes (126, 128) to the hub 100. The AAA server 122 may be provisioned with SIA information. The SIA information may include, for example, a mapping between a user and a service-context, and a mapping between a group of users and a service-context. Therefore, when a user connects to an IPSec hub 100, the IPSec hub 100 can obtain the per-user or per-group SIA service-context information from the AAA server 122. This information may be obtained during an IKE authorization or Xauth phase. The hub 100 can then query the SB 124 and obtain service information for that service-context to be applied to a user. This information may be attached to the IPSec SA in the SADB. In the data plane, the IPSec packets are decrypted and forwarded according to the attached service information in a particular SADB entry. The mapping and exchange of information facilitates integrating SIA with VPN tunneling.

A sequence of events labeled 131 through 138 illustrate processing associated with one embodiment of the example systems and methods where the VPN server acts as the SCL. Event 131 occurs during IKE/IPSec tunnel setup. A remote user (e.g., IPSec VPN client endpoint) initiates an IKE connection with the hub 100. Information passes back and forth between hub 100 and VPN branch 112. Event 132 occurs during IKE authorization. The hub 100 authenticates/authorizes the incoming IPSec VPN client with the AAA server 122. Information passes from the hub 100 to the AAA server 122. The information may include an IKE-ID. In one embodiment the IKE-ID may include, for example, a group name, an IP address, an FQDN, and an X509 Certificate field(s). In another embodiment the IKE-ID may include an XAuth username. This information is associated with IKE-ID to SIA service-context mapping.

Event 133 occurs when the AAA server 122 pushes SIA service-context information down to the hub 100. The SIA service-context information may be acquired from the AAA server 122 during IKE/IPSec tunnel setup. Event 133 may include sending SIA service-context information and corresponding classification rules for service-contexts. An SIA service-context and corresponding classification rule could correspond to an application (e.g., VoIP, Internet traffic). Therefore, differentiated services may ultimately be applied to traffic from a particular IPSec VPN client. This also facilitates applying differentiated services to traffic from different IPSec clients or groups of clients.

Event 134 occurs when the hub 100, acting as an SCL, queries the SB 124 for information. In one example, the hub 100 may have previously queried the SB 124 for information and may realize that it already has the information it needs to perform classification and thus provide differentiated services. In this case the hub 100 may not query SB 124. Event 135 occurs when the SB 124 pushes SIA information down to the hub 100. The SIA information may include, for example, service path information, service node information, and location information for a particular service-context that is included in the query.

Event 136 occurs when the hub 100 creates the mapping of service-context/path with an IPSec SA. In one example, the mapping may be maintained as a field and/or tuple for an IPSec SADB entry. At this point the IPSec tunnel to the remote user may come up. At this point the hub 100, which is acting as the SCL, is ready to process data traffic from a remote user and to apply differentiated services using SIA. Event 137 is the occurrence of encrypted data traffic. A remote user sends IPSec encrypted traffic to the hub 100. The hub 100 decrypts the encrypted traffic, adds an SIA service header(s) to the decrypted packet, may add a tunnel header to the decrypted packet, and during event 138 forwards the packet to the first service node 128 in the service-path.

In some large enterprises, the SIA SBs and SNs may be deployed in different networks. For example, an SB may be located in a campus network or a data center while the SNs may be located elsewhere (e.g., remote branch networks). In these large enterprises, there may be, for example, hundreds or thousands of remote branches that securely connect to a network using an IPSec VPN using a branch router. A branch router may function as a VPN remote endpoint and may also function as a SCL and/or SN. When functioning as an SCL or SN, the branch router may provide SIA classification and services for traffic originated in the branch. However, this may create a scaling issue for the SB as hundreds or thousands of SCLs and service nodes communicate directly with the SB that is located in a different network.

In one embodiment, the SIA framework may be extended to branch sites by making the VPN hub act as a pseudo-SB in order to mitigate this scaling issue. In this embodiment, the hub may perform like a mediation device that resides between the branch router/SCL located in one network and other SIA elements (e.g., SB/SN) located in other networks. In this embodiment, when the branch router brings up an IPSec tunnel to the hub, the hub may query the AAA server to acquire an associated service-context. The hub may then query the SB to acquire the associated service path, service node, and related information. With this information available, the hub can then provide the information to the branch router using IKE messages. This embodiment therefore appears to use a single control plane (e.g., IKE) instead of two control planes (e.g., IKE, SIA).

In one embodiment, SIA messages may be sent between a hub and a branch router using IKE Notify messages. In different examples, the IKE Notify Payload may be one of the notify message status types in the range 32768-40959. The branch router can act as an SCL and/or as an SN when it has the service-context and service path information. With this information, the branch router can also provide classification and services to traffic within the branch or exiting the branch.

Figure 2:
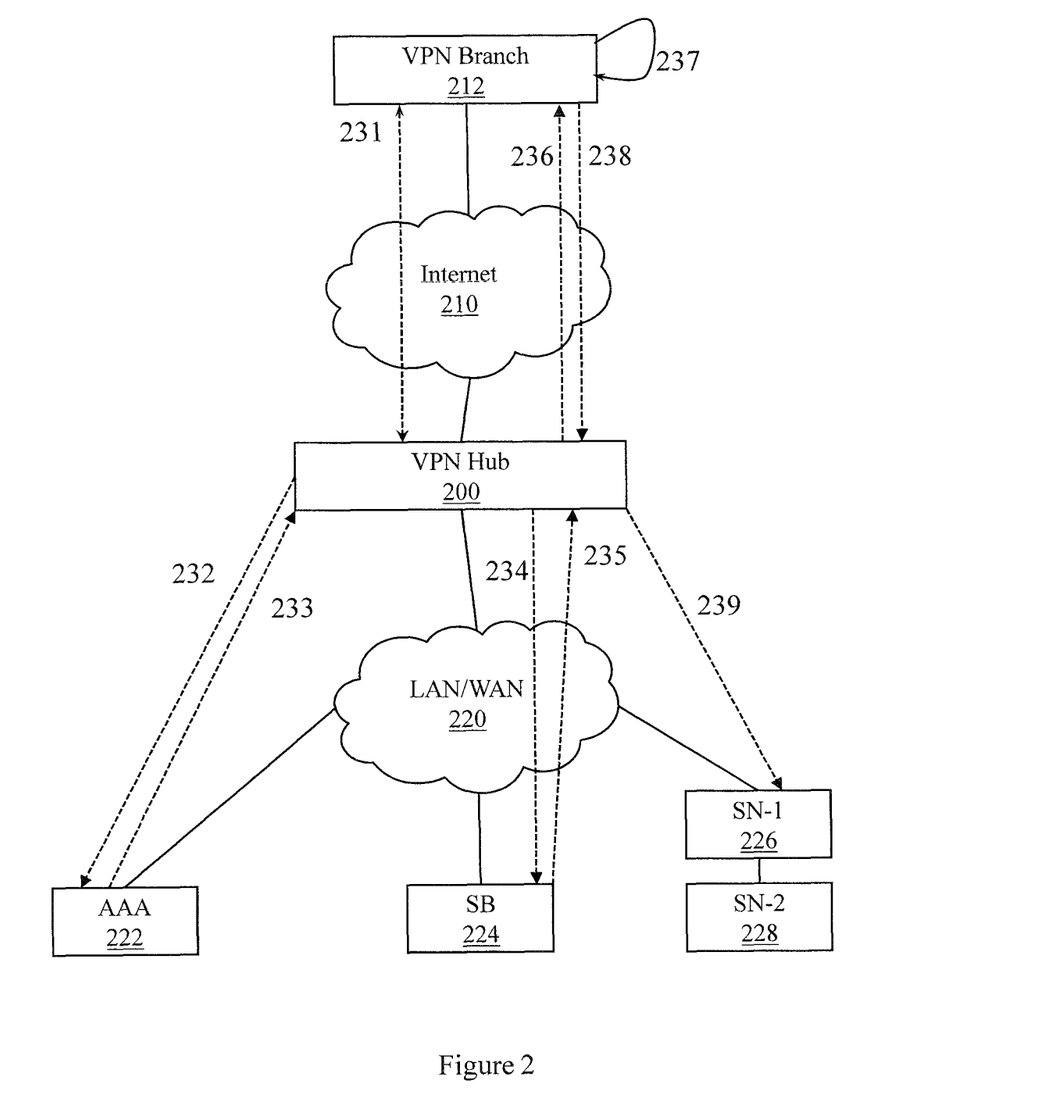
FIG. 2 illustrates an integration model where a branch router performs some SIA service classification activities.

FIG. 2 illustrates one example of IPSec SA to SIA mapping associated with a VPN client acting as SCL and a VPN Hub acting as a pseudo-SB. A VPN hub 200 is illustrated acting as a pseudo-SB. The VPN hub 200 sits between the internet 210 and a corporate network 220. The internet 210 connects a VPN branch 212 to the VPN hub 200. The VPN branch 212 is acting as an SCL. The corporate network 220 connects a AAA server 222 to the VPN hub 200. The corporate network 220 also connects an SIA SB 224 and two service nodes (226, 228) to the hub 200. A sequence of events labeled 231 through 239 illustrate processing associated with one embodiment of the example systems and methods where the VPN hub 200 acts as a pseudo SB and where the VPN branch router 212 acts as the SCL.

Event 231 occurs during IKE/IPSec tunnel setup. Information passes back and forth between hub 200 and VPN branch 212. Event 232 occurs during IKE authorization. Information passes from the hub 200 to the AAA server 222. The information may include, for example, an IKE-ID. In one embodiment the IKE-ID may include a group name, an IP address, an FQDN, and/or an X509 Certificate field(s). In another embodiment the IKE-ID may include an XAuth username. This information is associated with IDE ID-to-SIA service-context mapping.

Event 233 occurs when the AAA server 222 pushes SIA service-context information down to the hub 200. The SIA service-context information may be acquired from the AAA server 222 during IKE/IPSec tunnel setup. Event 234 occurs when the hub 200, acting as a pseudo-SB, queries the SB 224 for information. Event 235 occurs when the SB 224 pushes SIA information down to the hub 200. The SIA information may include, for example, service path information, service node information, and location information.

Event 236 occurs when the hub 200 sends the SIA information received from the SB 224 to the branch router 212. In one example, the SIA information is provided to the branch router 212 using SIA-payload in the IKE Notify message. Event 237 occurs when the branch router 212 installs the SIA information. The branch router 212 now has the capability to classify and service traffic that is bound to the internet 210 or corporate network (e.g., LAN/VAN 220). Event 238 is the occurrence of encrypted data traffic. The hub 200 decrypts the encrypted traffic, adds an SIA service header(s) to the decrypted packet, may add a tunnel header to the decrypted packet, and during event 239 provides the packet to the first service node 228.

In this embodiment where a VPN client at the branch router is acting as an SCL and where a VPN Hub is acting as a pseudo-SB, the following actions may occur. A new IKE Notify Payload may be used to exchange SIA information between IKE endpoints. The VPN hub acts as a pseudo SB thereby reducing the SIA endpoints directly serviced by the "real" SB. The VPN hub queries the AAA server to obtain SIA service-context information during an IKE authorization/authentication phase. The hub also queries the SB to obtain SIA information for that service-context. The hub reformats SIA information from the SB into the IKE Notify Payload message and sends it to the branch router acting as the SCL. In this embodiment, the SIA information is reformatted into the IKE message. In another embodiment, the SIA messaging remains unmodified, and is exchanged verbatim between IPSec endpoints using the IKE control plane.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

It has proven convenient at times, principally for reasons of common usage, to refer to these signals as using terms like bits, values, elements, symbols, characters, terms, and numbers. It should be borne in mind, however, that these and similar terms are to be associated with the appropriate physical quantities and are merely convenient labels applied to these quantities. Unless specifically stated otherwise, it is appreciated that throughout the description, terms including, for example, processing, computing, and determining refer to actions and processes of a computer system, logic, processor, or similar electronic device that manipulates and transforms data represented as physical (electronic) quantities.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 5:
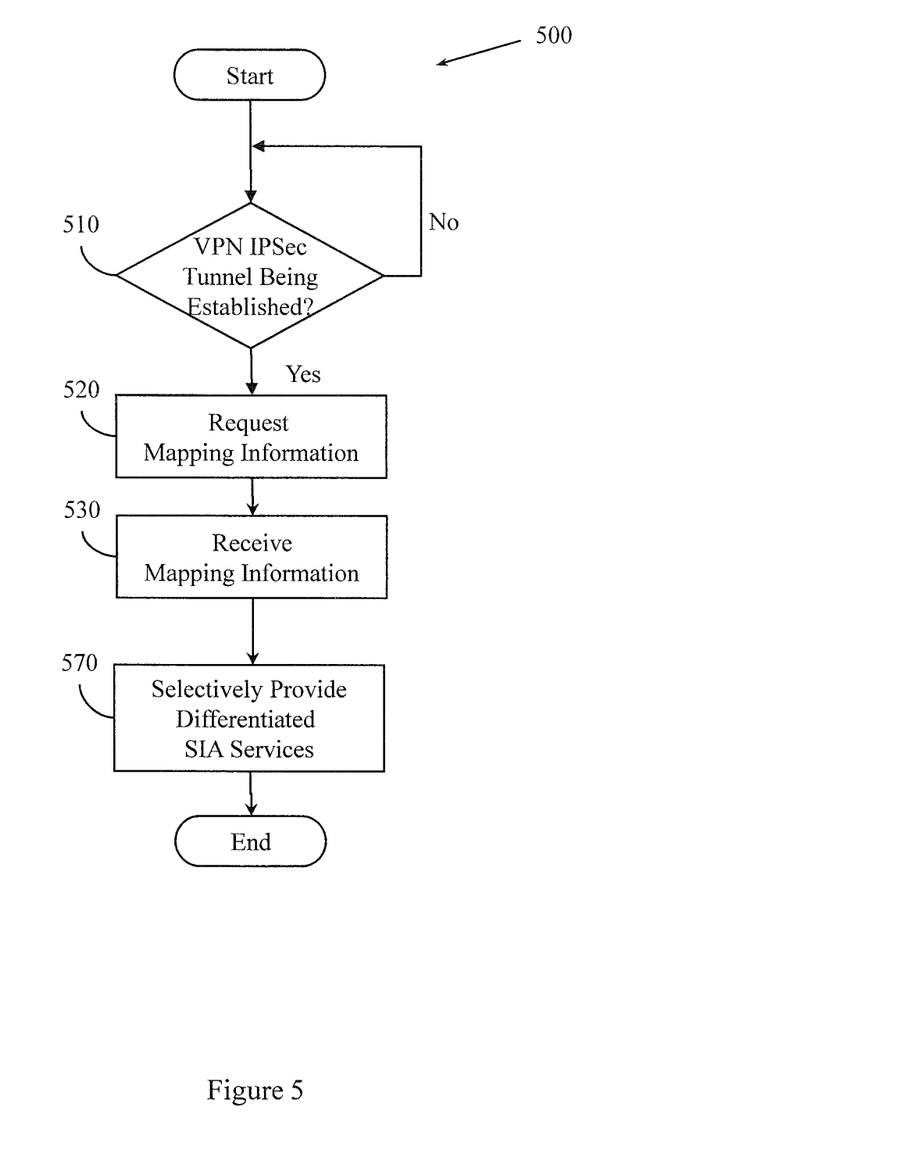
FIG. 5 illustrates a method associated with integrating an SIA and a VPN.

FIG. 5 illustrates a method 500 associated with having SIA and VPN technology work together. Method 500 may be performed by a networking device (e.g., router, hub). Method 500 includes, at 510, determining that an IPSec tunnel associated with a VPN client is being established for a remote access user. When the establishment has been determined at 510, method 500 proceeds, at 520, to request mapping information that correlates an SIA service-context to the VPN Client (e.g., user). The request may be made in an IPSec authentication message exchange with an authentication logic associated with the IPSec tunnel. The authentication logic may be, for example, an IPSec authentication and authorization server. The IPSec authentication message exchange may be, for example, an IKE message exchange.

Method 500 also includes, at 530, receiving the mapping information from the authentication logic. In one example, the mapping information may reside in the authentication logic because method 500 established the mapping information and then stored the mapping information in the authentication logic. The mapping information may be, for example, a client-to-service-context correlation.

Method 500 also includes, at 570, selectively providing differentiated services in the SIA for the remote access user based, at least in part, on the mapping information. As described above, decisions concerning differentiated services may be made in different locations and/or by different entities. For example, decisions may be made at the IPSec hub, at a branch router, and other locations. Therefore, in one embodiment, a service classification decision concerning selectively providing differentiated services in the SIA for the remote access user is made by method 500 in an IPSec hub associated with the IPSec VPN. However, in another embodiment, a service classification decision concerning selectively providing differentiated services in the SIA for the remote access user is made by method 500 in a branch router associated with the IPSec VPN.

While FIG. 5 illustrates various actions occurring in serial, it is to be appreciated that various actions illustrated in FIG. 5 could occur substantially in parallel. By way of illustration, a first process could determine whether a VPN IPSec tunnel is being established, a second process could request and receive mapping information, and a third process could selectively provide differentiated SIA services. While three processes are described, it is to be appreciated that a greater and/or lesser number of processes could be employed and that lightweight processes, regular processes, threads, and other approaches could be employed.

In one example, executable instructions associated with performing a method may embodied as computer executable instructions stored in one or more computer readable media. When executed, the instructions may perform a method. Thus, in one example, a computer readable medium may store computer executable instructions that if executed by a machine (e.g., processor) cause the machine to perform method 500. While executable instructions associated with method 500 are described as being embodied on a computer readable medium, it is to be appreciated that executable instructions associated with other example methods described herein may also be stored on a computer readable medium.

A "computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 6:
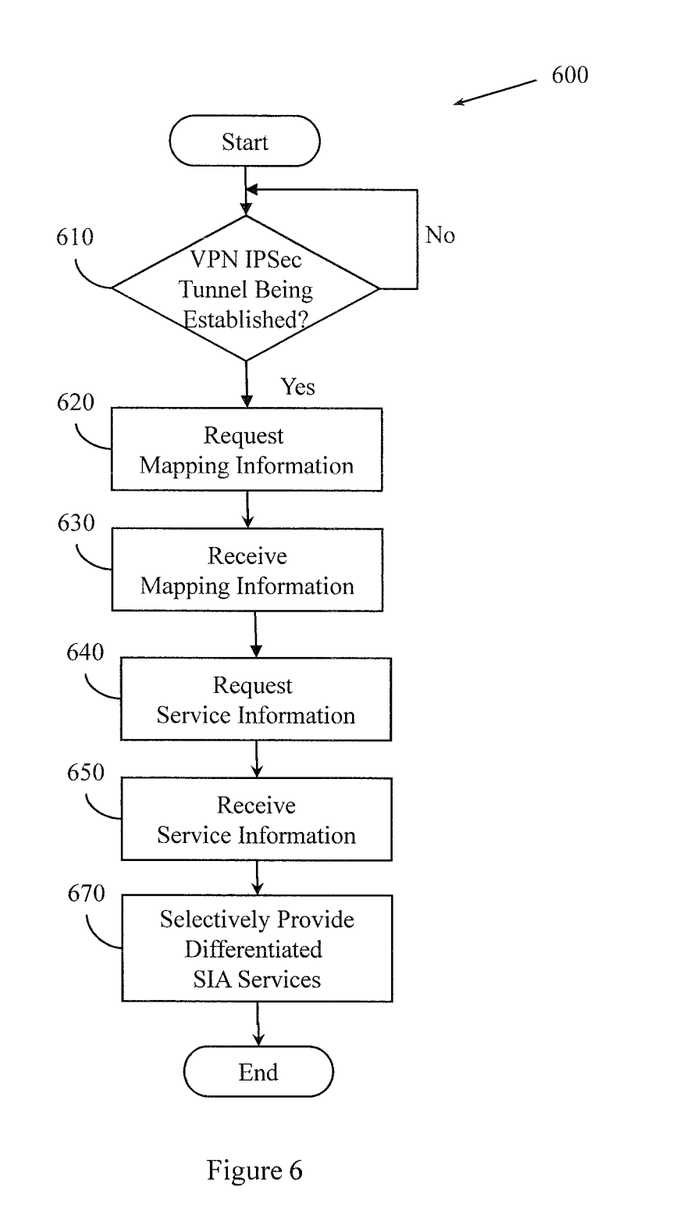
FIG. 6 illustrates another method associated with integrating an SIA and a VPN.

FIG. 6 illustrates a method 600. Method 600 includes, at 610, determining that the VPN IPSec tunnel is being established, requesting mapping information at 620, and receiving mapping information at 630. Method 600 also includes additional actions.

For example, upon receiving the mapping information, method 600 includes, at 640, requesting service information associated with providing differentiated services in the SIA for the remote access user. The service information may be requested from an SIA SB. Method 600 also includes, at 650, receiving the service information. The service information may include, for example, a service path information, a service path table, a service node identifier, a service node next hop identifier, and an encapsulation option identifier.

With the mapping information and service information available, method 600 then proceeds, at 670, to selectively provide differentiated services in the SIA for the remote access user based, at least in part, on the mapping information and/or the service information.

Since the method 600 acquires mapping information and service information, method 600 may also selectively update an IPSec SADB entry to map an IPSec security association (SA) to an SIA service-context. Updating the SADB may include storing a portion of the mapping information, storing a portion of the service information, and storing other information. Providing the differentiated services at 670 may be achieved by, for example, mapping a packet received on the IPSec tunnel to an SIA service path based on the IPSec SA.

Portions of method 600 may be distributed between two or more networking devices and/or may control two or more networking devices. Therefore, method 600 may receive redundancy information from an SB. The redundancy information may identify a backup hub/SCL that also has the mapping information and the service information. This redundancy information may be available to a backup hub/SCL if and when a primary hub/SCL goes down. Method 600 may also provide stateful IPSec redundancy by configuring two or more IPSec VPN hubs in an active/standby configuration using a hot standby routing protocol (HSRP) and controlling the two or more IPSec VPN hubs to exchange security association database SADB information through SSO. The SADB entry may include, but is not limited to include, information concerning an SIA service-context, information concerning an SIA service path, and information concerning an SIA node.

Figure 7:
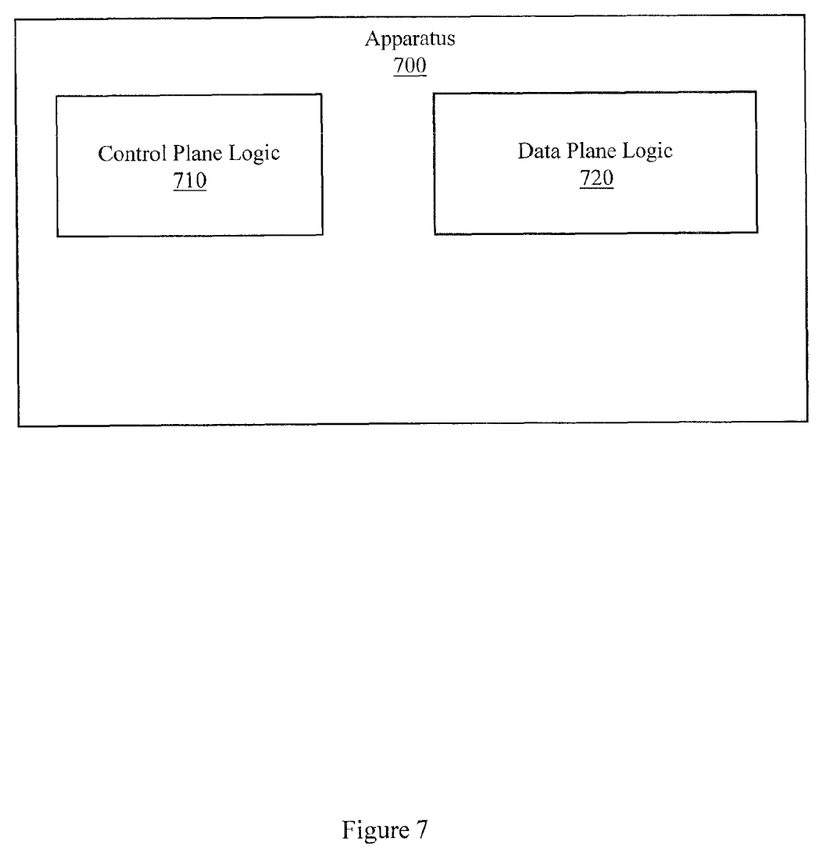
FIG. 7 illustrates an apparatus associated with integrating an SIA and a VPN.

FIG. 7 illustrates an apparatus 700 associated with integrating SIA and VPN technologies. Apparatus 700 includes a control plane logic 710 and a data plane logic 720. The control plane logic 710 is configured to dynamically map an SIA service to an IPSec VPN tunnel user. The dynamic mapping is based, at least in part, on a user-to-SIA service-context mapping acquired during authentication of the user. The authentication is associated with IPSec VPN tunnel establishment.

The data plane logic 720 is configured to selectively forward an IPSec packet received on the IPSec VPN tunnel from the user to a service node associated with the SIA service. The selection is based, at least in part, on the user-to-SIA service-context mapping received by the control plane logic 710.

In one example, the control plane logic 710 is configured to provision an IPSec VPN tunnel authentication logic with the user-to-SIA service-context mapping. Since the control plane logic 710 can provision the IPSec tunnel authentication logic, the control plane logic 710 can also be configured to acquire the user-to-SIA service-context mapping from the authentication logic.

Acquiring the user-to-SIA service-context mapping may be just a first step in making SIA and VPN technologies work together. The user-to-SIA service-context mapping may provide information that facilitates acquiring additional service information. Therefore, in one example, the control plane logic 710 may be configured to query an SIA SB to obtain service information to apply to the traffic from the IPSec VPN tunnel user. Having gone to the work of acquiring mapping information and service information, apparatus 700 may desire to store that information. Therefore, in one example, the control plane logic 710 may be configured to selectively associate a portion of the service information to an IPSec SA in an SADB.

One skilled in the art will appreciate that in different embodiments the control plane logic 710 may reside in one device or be distributed in different devices. Thus, in one example, at least a portion of the control plane logic 710 is located in a VPN hub configured as an SIA SCL. In another example, at least a portion of the control plane logic 710 is located in a branch router associated with the IPSec VPN.

Figure 8:
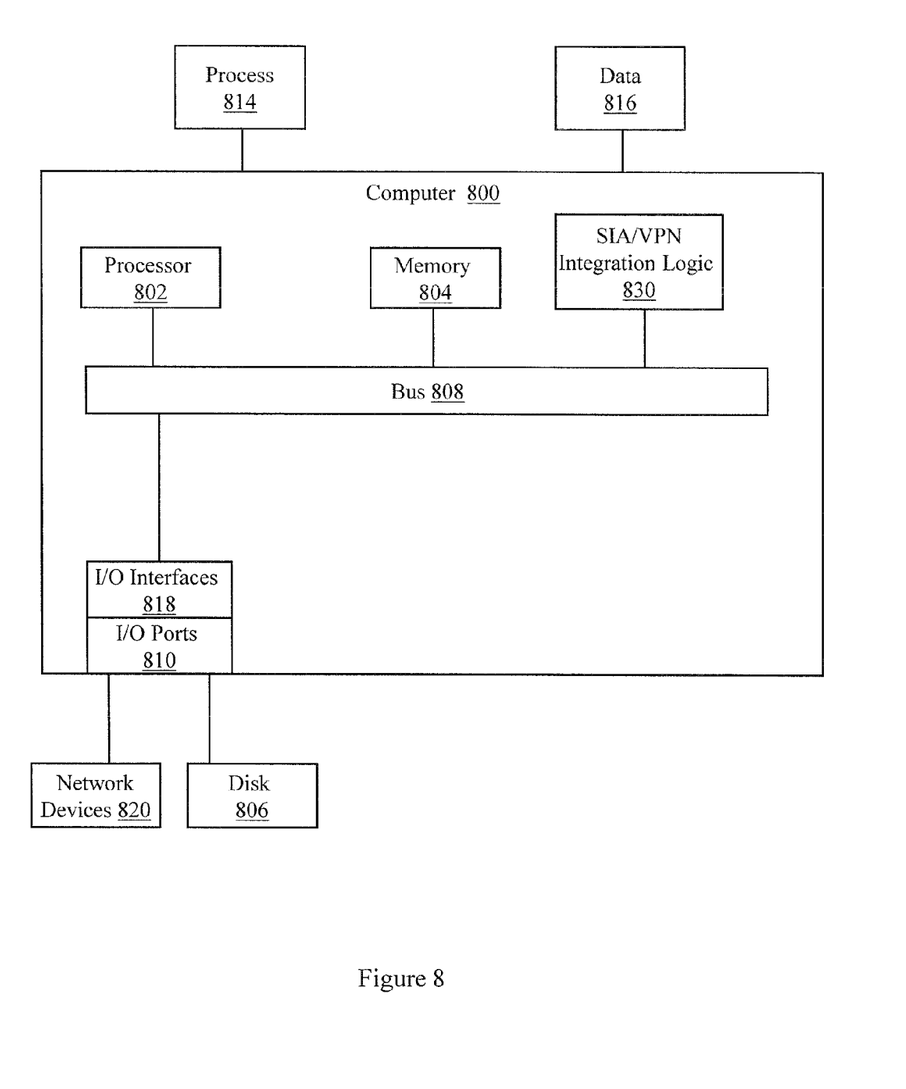
FIG. 8 illustrates an example computing environment in which example systems and methods, and equivalents, may operate.

"Logic", as used herein with respect to FIGS. 7 and 8 includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, and a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include an SIA/VPN integration logic 830 configured to facilitate integrating SIA and VPN technologies. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Hardware component", as used herein, refers to a computer-related entity. Hardware components may include, for example, a process running on a processor, a processor, an object, an executable, and a thread of execution. A hardware component(s) may include a process and/or thread. A hardware component may be localized on one computer and/or may be distributed between multiple computers.

Logic 830 may provide means (e.g., hardware, software, firmware) for provisioning an IPSec authentication server with user-to-SIA service-context mapping information. The means may be implemented, for example, as an ASIC programmed to facilitate integrating SIA and VPN technologies. The means may also be implemented as computer executable instructions that are presented to computer 800 as data 816 that are temporarily stored in memory 804 and then executed by processor 802.

Logic 830 may also provide means (e.g., hardware, software, firmware) for acquiring, in an IPSec VPN hub, during IPSec tunnel user authentication, from the IPSec authentication server, the user-to-SIA service-context mapping information. Logic 830 may also provide means (e.g., hardware, software, firmware) for dynamically mapping an SIA service to an IPSec VPN tunnel user based on the user-to-SIA service-context mapping information. Logic 830 may also include means for acquiring SIA service information from a service broker. Logic 830 may also provide means (e.g., hardware, software, firmware) for selectively forwarding an IPSec packet received on the IPSec VPN tunnel from the user to a service node associated with the SIA service based, at least in part, on the SADB entry modified using the SIA service information.

Generally describing an example configuration of the computer 800, the processor 802 may be a variety of various processors including dual microprocessor and other multiprocessor architectures. A memory 804 may include volatile memory and/or non-volatile memory. Non-volatile memory may include, for example, ROM, and programmable ROM (PROM). Volatile memory may include, for example, RAM, static RAM (SRAM), and dynamic RAM (DRAM).

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, and a memory stick. Furthermore, the disk 806 may be, for example, a CD-ROM drive, a CD recordable (CD-R) drive, a CD rewriteable (CD-RW) drive, a digital versatile disk and/or digital video disk read only memory (DVD ROM). The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., peripheral component interconnect express (PCIE), 1394, universal serial bus (USB), Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, and the network devices 820. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

While example systems and methods other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the examples described herein. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:
1. A method, comprising:
using a computing device, upon determining that an IPSec tunnel associated with a virtual private network (VPN) is being established for a remote access user:
requesting from an authentication logic, during IPSec authentication message exchange associated with the

IPSec tunnel, mapping information that correlates a service insertion architecture (SIA) service-context to the remote access user;

receiving the mapping information from the authentication logic; and wherein the mapping information comprises service path information;

wherein the service path information comprises segments, each of which represents a service feature that provides functionality other than VPN establishing or forwarding, and identifies a service node that provides the service feature;

upon receiving data traffic on the IPSec tunnel, selectively providing differentiated services, identified in the service path information for the remote access user, based, at least in part, on the mapping information.

2. The method of claim 1, comprising:

establishing the mapping information;

storing the mapping information in the authentication logic; and providing the mapping information as attributes, where the attributes are configured to be understood by the authentication logic and a requesting entity.

3. The method of claim 2, the authentication logic being implemented on an authentication, authorization, and accounting server.

4. The method of claim 1, the IPSec authentication message exchange being an Internet Key Exchange (IKE) message exchange.

5. The method of claim 1, comprising:

upon receiving the mapping information, requesting, from an SIA service broker (SB), service information associated with providing the differentiated services in the SIA for the remote access user;

receiving the service information; and selectively providing the differentiated services in the SIA for the remote access user based, at least in part, on the service information.

6. The method of claim 5, the service information comprising one or more of, a service path table, a service node identifier, a service node next hop identifier, and an encapsulation option identifier.

7. The method of claim 5, comprising selectively updating an IPSec security association database (SADB) to map an IPSec security association (SA) to an SIA service-context by storing one or more of, a portion of the mapping information, and a portion of the service information.

8. The method of claim 7, comprising forwarding a packet received on the IPSec tunnel over an SIA service path based on the IPSec SA.

9. The method of claim 7, where a service classification decision concerning selectively providing the differentiated services in the SIA for the remote access user based, at least in part, on the mapping information and the service information, is made in an IPSec hub associated with the IPSec VPN.

10. The method of claim 7, where a service classification decision concerning selectively providing the differentiated services in the SIA for the remote access user based, at least in part, on the mapping information and the service information, is made in a branch router associated with the IPSec VPN.

11. The method of claim 8, where forwarding the packet received on the IPSec tunnel comprises reformatting SIA information into an IKE message.

12. The method of claim 8, where forwarding the packet received on the IPSec tunnel comprises forwarding unmodified SIA information between IPSec endpoints using the IKE control plane.

13. An apparatus, comprising:

a control plane logic configured to dynamically map an SIA service to an IPSec VPN tunnel user based, at least in part, on a user-to-SIA service-context mapping acquired during authentication of the user to the IPSec VPN tunnel during IPSec VPN tunnel establishment; and wherein the mapping comprises service path information;

wherein the service path information comprises segments, each of which represents a service feature that provides functionality other than VPN establishing or forwarding, and identifies a service node that provides the service feature;

a data plane logic configured to selectively forward, upon receiving data traffic on the IPSec tunnel, an IPSec packet received on the IPSec VPN tunnel from the user to a service node associated with the SIA service based, at least in part, on a SADB entry derived as a function of the mapping and the service path information provided by a service broker to a service classifier.

14. The apparatus of claim 13, the control plane logic being configured to provision an IPSec VPN tunnel authentication logic with the user-to-SIA service-context mapping.

15. The apparatus of claim 13, the control plane logic being configured to acquire the user-to-SIA service-context mapping from an authentication logic.

16. The apparatus of claim 15, the control plane logic being configured to query an SIA service broker to obtain service information based at least in part, on mapping information, to apply to the IPSec VPN tunnel user.

17. The apparatus of claim 16, the control plane logic being configured to selectively associate a portion of the service path information with an IPSec security association (SA) in a security association database (SADB).

18. The apparatus of claim 17, the control plane logic being located, at least in part, in a VPN hub configured as an SIA service classifier (SCL).

19. The apparatus of claim 17, the control plane logic being located, at least in part, in a VPN client at a branch router associated with the IPSec VPN.

20. A system, comprising:

means for provisioning an authentication logic with user-to-SIA service-context mapping information;

means for acquiring, in an IPSec VPN hub, during IPSec tunnel user authentication, from the authentication logic, the user-to-SIA service-context mapping information;

means for dynamically mapping an SIA service to an IPSec VPN tunnel user based on the user-to-SIA service-context mapping information;

wherein the mapping information comprises service path information;

wherein the service path information comprises segments, each of which represents a service feature that provides a functionality other than VPN establishing or forwarding, and identifies a service node that provides the service feature;

means for acquiring SIA service information from a service broker; and means for selectively forwarding, upon receiving data traffic on the IPSec VPN tunnel, an IPSec packet received on the IPSec VPN tunnel from the user to a service node associated with the SIA service based, at least in part, on a SADB entry modified using the SIA service information.

21. A non-transitory computer-readable storage medium storing computer executable instructions which, when executed by one or more processors, cause the one or more processors to perform:
  upon determining that an IPSec tunnel associated with a virtual private network (VPN) is being established for a remote access user:
  requesting from an authentication logic, during IPSec authentication message exchange associated with the IPSec tunnel, mapping information that correlates a service insertion architecture (SIA) service-context to the remote access user;
  wherein the mapping information comprises service path information;
  wherein the service path information comprises segments, each of which represents a service feature that provides a functionality other than VPN establishing or forwarding, and identifies a service node that provides the service feature;
  receiving the mapping information from the authentication logic; and
  upon receiving data traffic on the IPSec tunnel, selectively providing differentiated services, identified in the service path information for the remote access user, based, at least in part, on the mapping information.

22. The non-transitory computer-readable storage medium of claim 21, further storing additional instructions which, when executed, cause the one or more processors to perform:
  establishing the mapping information;
  storing the mapping information in the authentication logic;
  providing the mapping information as attributes, where the attributes are configured to be understood by the authentication logic and a requesting entity.

23. The non-transitory computer-readable storage medium of claim 21, wherein the IPSec authentication message exchange is an Internet Key Exchange (IKE) message exchange.

24. The non-transitory computer-readable storage medium of claim 21, further storing additional instructions which, when executed, cause the one or more processors to perform:
  upon receiving the mapping information, requesting, from an SIA service broker (SB), service information associated with providing the differentiated services in the SIA for the remote access user;
  receiving the service information;
  selectively providing the differentiated services in the SIA for the remote access user based, at least in part, on the service information.

25. The system of claim 20, wherein the IPSec authentication message exchange is an Internet Key Exchange (IKE) message exchange.

* * * * *